United States Patent Office 2,927,059
Patented Mar. 1, 1960

2,927,059

AMINO ACID SYNTHESIS

Robert C. Good, Northbrook, and Irwin C. Gunsalus, Urbana, Ill., assignors to International Minerals & Chemical Corporation, a corporation of New York No Drawing. Application June 27, 1956
Serial No. 594,091

16 Claims. (Cl. 195—29)

This invention is concerned with the synthesis of alpha-amino carboxylic acids, and more particularly with the preparation of such acids by enzymatic treatment of the corresponding alpha-keto carboxylic acids.

Glutamic acid is a well-known constituent of proteins, and is widely used as a flavor-intensifying agent in the form of the monosodium salt of its L-enantiomorph. Substantially all of the L-glutamic acid utilized for the preparation of monosodium L-glutamate is obtained at the present time from natural sources such as wheat gluten and sugar beet residues, for example, from Steffen's filtrate. While it is known that L-glutamic acid may be synthetically produced, most processes for synthesizing glutamic acid produce the racemic mixture, DL-glutamic acid, which must be further processed (resolved) to produce L-glutamic acid. No process has yet been commercially proved for effecting such resolution.

It is known that glutamic dehydrogenase from liver, kidney, and heart tissues reversibly oxidizes L-glutamic acid to alpha-ketoglutaric acid and ammonia in the presence of coenzyme I or coenzyme II, the initial reaction probably being the formation of iminoglutaric acid, which then hydrolyzes spontaneously to alpha-ketoglutaric acid and ammonia (Sumner and Somers, "Chemistry and Methods of Enzymes," New York: Academic Press, Inc., Third Edition (1953), page 269). Thus, it is possible to prepare L-glutamic acid from alpha-ketoglutaric acid and ammonia by the action of such glutamic dehydrogenase (Hunter and Hixon, J. Biol. Chem., 181 (1949), page 67; cited by Sumner and Myrback, "The Enzymes," New York: Academic Press, Inc. (1953), vol. II, part 1, page 308). Glutamicdehydrogenase from yeast exhibits a similar action (Sumner and Somers, op. cit., page 268).

The present invention is an improvement in the enzymatic production of L-alpha-amino carboxylic acids from the corresponding alpha-keto carboxylic acids.

It is an object of the invention to provide an improved process for preparing L-alpha-amino carboxylates from the corresponding alpha-keto carboxylates.

It is another object of the invention to prepare L-alpha-amino carboxylic acids by the yeast fermentation of the corresponding alpha-keto carboxylic acids in an improved manner.

Another object of the invention is to provide an improved process for converting alpha-ketoglutaric acid to L-glutamic acid.

Another object of the invention is to improve the yield of L-glutamic acid obtained in the fermentation of alpha-keto-glutaric acid with yeast.

Still another object of this invention is to provide a commercially practicable procedure for preparing L-glutamic acid by enzymatic conversion of alpha-ketoglutaric acid.

We have now discovered that the enzymatic conversion of alpha-keto carboxylic acids to the corresponding L-alpha-amino carboxylic acids is advantageously carried out with whole yeast cells in the presence of a lipid solvent, the reaction medium being otherwise of conventional composition. The lipids are extracted from the yeast cells by the solvent, and the cells are greatly improved in permeability in this way. The interchange of enzymes and reactants between the yeast cells and the reaction medium is, in our belief, greatly facilitated thereby, although it is understood that this is only a reasonable theory of the reaction mechanism and we do not wish to be bound thereby. In any event, the yield of the desired product is substantially greater in our process than in the processes of the prior art.

We have further discovered that the yield of the desired product is considerably improved if the fermentation medium, prior to the introduction of alpha-keto carboxylic acid, is subjected to a preincubation period of about 1 to 10 hours, preferably around 2 hours, under the fermentation conditions thereafter to be employed. It is our belief that the observed improvement results from a build-up of diphosphopyridine nucleotide (DPN) during the preincubation period, although in this respect also we do not wish to be restricted in any way by the suggested mechanism.

We have additionally discovered that the fermentation is advantageously carried out in the absence of free oxygen, and preferably under an atmosphere of carbon dioxide.

The term "alpha-amino carboxylate" as used herein is intended to refer to alpha-amino carboxylic acid, alpha-amino dicarboxylic acid, and the alkali metal and alkaline earth metal salts of these materials. Similarly, the term "alpha-keto carboxylate" as used herein is intended to refer to alpha-keto carboxylic acid, alpha-keto dicarboxylic acid, and the alkali metal and alkaline earth metal salts of these acids.

The term "fermentation" as used in this description and attached claims is intended to include any process in which organisms are employed to catalyze the conversion of a substrate into one or more desired products.

While alpha-ketoglutarate is the preferred alpha-keto carboxylate for our process, yielding L-glutamic acid, other alpha-keto carboxylates may be employed to advantage for the synthesis of other alpha-amino carboxylates; for example, oxalacetate to produce aspartic acid, pyruvate to produce alanine, methyl-alpha-ketobutyric acid to produce valine, etc. Also alpha-keto carboxylate precursor compounds such as citrate, isocitrate, or aconitate for alpha-ketoglutarate; fumarate or malate for oxalacetate; or the fermentable carbohydrates as precursors of alpha-ketoglutarate or oxalacetate may be employed to replace the alpha-keto carboxylate wholly or partially in conducting our novel process. The use of fumarate and malate are not limited only to the production of oxalacetate, but in some instances these substances will be converted into aspartic acid without first producing oxalacetate.

In accordance with one embodiment of this invention, an alpha-keto carboxylate is treated with whole yeast cells in a suitable aqueous medium containing a lipid solvent until the alpha-keto carboxylate is substantially converted to the corresponding alpha-amino carboxylate. Any lipid solvent may be utilized, but carbon tetrachloride is particularly preferred. Other suitable lipid solvents include ethylene dichloride, trichloroethylene, benzene, toluene, ethyl ether, and the like. The quantity of lipid solvent should be sufficient to dissolve free lipids substantially completely from the cells. For this purpose, about 50% by weight of solvent, based on the dry yeast cells, is ordinarily sufficient in a well agitated system, and we prefer to use from about 100 to about 500% by weight of solvent on the same basis.

The fermentation medium will suitably contain ammonium ions, phosphate ions, a fermentable carbohydrate, whole yeast cells, water, and optionally a metallic ion enzyme activator.

The ammonium and phosphate ions need not be added in the form of ammonium phosphate, although this compound affords a convenient method for introducing these ions. The phosphate ions may optionally be added in the form of phosphoric acid or other phosphate salts and the ammonium ions added in the form of ammonia or some simple ammonium salt. For example, the phosphate ions may be added in the form of an alkali metal phosphate such as sodium phosphate and the ammonium ions added in the form of ammonium chloride, ammonium hydroxide, or the like.

It is desirable that the aqueous medium have a pH between about 6 and about 8 during the fermentation. If highest yields are desired, the pH may be controlled by adjustment of the ammonia content of the medium, but preferably the medium will contain between about 30 and about 750 micromoles of ammonia per milliliter regardless of the form in which the ammonia is added, and necessary adjustment of the pH of the medium to bring the pH within the range of about 6 to 8 may be made by adding an alkali metal hydroxide, such as sodium hydroxide, to the mixture to avoid disturbing the ammonia concentration. It has been found that the use of more than about 400 micromoles of ammonia per milliliter of the medium does not favorably affect the yield of alpha-amino carboxylate, but that if the medium contains between about 30 and about 400 micromoles of ammonia per milliliter and adjustment of the pH of the reaction solution prior to incubation to between about 6 and about 8 is effected by adding an alkali metal hydroxide, the yield of alpha-amino carboxylate is increased by about 15 to 20% of the yield which would be obtained if the pH adjustment were made with ammonia alone.

The alpha-keto carboxylate concentration in the fermentation medium may range from about 0.2 to about 10% by weight, but is preferably between about 1 and about 4%.

It is preferred to carry out the fermentation reaction in the presence of sucrose, but any fermentable carbohydrate may be utilized including fructose, glucose, maltose, mannose and invert sugar (glucose plus fructose). In addition to these sugars, pentoses are fermented by Torulopsis yeast and may be utilized when this species is employed.

The fermentation medium may optionally and advantageously contain a metallic ion enzyme activator. Various salts of bivalent metals may be used, for example, the simple salts of cobalt, zinc, and ferrous iron. Manganous sulfate is a preferred activator, but magnesium sulfate may be utilized if desired. Generally speaking, any metallic salt capable of catalyzing the yeast conversion of an alpha-keto carboxylate to the corresponding alpha-amino carboxylate may be utilized, but manganous sulfate is preferred. The activator, when used, is desirably present in an amount of between about $10^{-6}$ to about $10^{-2}$ molar concentration based upon the total fermentation reaction mixture, preferably between about $10^{-4}$ and about $10^{-2}$.

Whole yeast cells of any species can be used in our invention. Baker's yeast (Saccharomyces cerevisiae) and Torulopsis utilis are particularly preferred. However, brewer's yeast (Saccharomyces cerevisiae) and certain species of Rhodotorula and Pichia may also be utilized advantageously. It is, of course, desirable that the yeast be freshly prepared or in an equivalent condition.

The fermentation is desirably conducted at a temperature between about 20° C. and about 50° C., but somewhat higher or lower temperatures may also be utilized. Temperatures between about 35 and about 40° C. are preferred. The fermentation generally requires at least 15 minutes for substantial conversion of the alpha-keto carboxylate starting material, and a fermentation period of about 10 to about 20 hours is ordinarily sufficient for substantially complete reaction. Usually, there is no advantage in permitting the reaction to proceed for longer than about 48 hours. The length of time required for complete fermentation is affected by the amount of yeast employed, larger amounts of yeast making it possible to shorten the fermentation time. From 1 to 10% or more by weight of yeast (dry basis) can satisfactorily be employed, based on the fermentation medium, but we prefer to use between about 2 and about 4%.

It is quite feasible in carrying out the instant invention that all ingredients be added to the aqueous medium simultaneously or at about the same time, but highest yields of alpha-amino carboxylate are obtained if a two-step procedure is followed whereby all of the ingredients of the medium, with the exception of the alpha-keto carboxylate, are added to the reaction vessel and the resulting solution incubated for a short period of time (for example, between about 15 minutes and about 2 hours) at the particular temperature to be utilized (for example, between about 20 and about 50° C., preferably 35 to 40° C.). Following this preincubation, the alpha-keto carboxylate, which has been adjusted to a pH between about 6 and about 8 with alkali, preferably with potassium hydroxide, is added, and the resulting solution is adjusted to a pH between about 6 and about 8 with alkali, again preferably with potassium hydroxide. The final mixture is incubated at a temperature between about 20° C. and about 50° C., preferably 35 to 40° C., until the conversion reaction of alpha-keto carboxylate is substantially complete. Usually between about 15 minutes and about 20 hours is required for this purpose. By carrying out this two-step procedure involving a preincubation period, alpha-amino carboxylate is produced in yields about 15% higher than when a preincubation period is not used.

While the fermentation can be carried out successfully in contact with air, we prefer to operate in the absence of free oxygen. Best results appear to be obtained by sweeping the air from the fermenter with carbon dioxide and maintaining an atmosphere of carbon dioxide therein throughout the fermentation.

The following examples illustrate specific embodiments of the instant invention. All parts and percentages are by weight unless otherwise indicated.

*Example I*

The following tests illustrate the use of a variety of lipid solvents. An aqueous fermentation medium having the following composition was prepared:

| | |
|---|---|
| 0.2 M dibasic ammonium phosphate (pH 7.6 with HCl) ml | 30.0 |
| $MnSO_4$ (0.003 M) ml | 0.2 |
| Water ml | 9.8 |
| Dry baker's yeast, Type 1821 g | 6.0 |
| Sucrose g | 2.0 |
| Lipid solvent (designated below) ml | 10.0 |

The medium was incubated 2 hours at 37° C., then 60 ml. of aqueous 2% alpha-ketoglutaric acid solution (adjusted to pH 7.6 with NaOH) were added. The complete mixture was adjusted to pH 7.6 with NaOH and returned to the 37° C. incubator. Samples were withdrawn from analysis from time to time. The results were as follows:

| Lipid Solvent | Time, hr. | α-Keto-glutarate added, μM./ml. | L-Glutamic Acid | | |
|---|---|---|---|---|---|
| | | | Found, μM./ml. | Synthesized, μM./ml. | Conversion, percent |
| CCl₄ | 0 | 82 | 21.9 | | |
| | 3.5 | | 35.6 | 13.7 | 16.7 |
| | 9.5 | | 56.2 | 34.3 | 41.8 |
| | 24 | | 68.5 | 46.6 | 56.7 |
| Benzene | 0 | 82 | 16.4 | | |
| | 3.5 | | 31.5 | 15.1 | 18.4 |
| | 9.5 | | 34.2 | 17.8 | 21.7 |
| | 24 | | 46.6 | 30.2 | 36.8 |
| Trichloroethylene | 0 | 82 | 9.6 | | |
| | 3.5 | | 35.6 | 26.0 | 31.7 |
| | 9.5 | | 45.2 | 35.6 | 43.3 |
| | 24.0 | | 54.8 | 45.2 | 55.0 |

*Example II*

The foregoing example illustrates successful fermentations in which the fermentation medium included both whole yeast cells and lipid solvent. The following test illustrates the comparatively poor results obtained when the fermentation is carried out in the presence of a lipid solvent (carbon tetrachloride) extract of yeast cells, but in the absence of the yeast cells themselves.

An aqueous fermentation medium having the composition described in Example I and containing carbon tetrachloride as the lipid solvent was incubated for 2 hours at 37° C., then centrifuged to remove the yeast cells. The supernatant liquor was collected, commingled with 60 ml. of aqueous 2% alpha-ketoglutaric acid solution (adjusted to pH 7.6 with NaOH), and returned to the 37° C. incubator. Samples were withdrawn from time to time for analysis, with the following results:

| Lipid Solvent | Time, hr. | α-Keto-glutarate added, μM./ml. | L-Glutamic Acid | | |
|---|---|---|---|---|---|
| | | | Found, μM./ml. | Synthesized, μM./ml. | Conversion, percent |
| CCl₄ | 0 | 82 | 6.8 | | |
| | 3.5 | | 16.4 | 9.6 | 11.7 |
| | 9.5 | | 19.2 | 12.4 | 15.1 |
| | 24 | | 19.2 | 12.4 | 15.1 |

*Example III*

The following test demonstrates the advantage of pre-incubating the fermentation medium before adding alpha-ketoglutarate. Two portions of a medium were prepared as described in Example I and adjusted to pH 7.6 with NaOH. One portion was preincubated for 2 hours at 37° C., while the second portion was not preincubated. To each portion were added 82 μM./ml. of alpha-ketoglutarate, and the primary incubation was carried out at 37° C. Samples were removed for analysis at 0, 5, 10, and 24 hours. The results were as follows:

| Treatment | Time, hr. | α-Keto-glutarate added, μM./ml. | L-Glutamic Acid | | |
|---|---|---|---|---|---|
| | | | Found, μM./ml. | Synthesized, μM./ml. | Conversion, percent |
| Pre-incubated | 0 | 82 | 23.1 | | |
| | 5 | | 48.8 | 25.7 | 31.3 |
| | 10 | | 63.8 | 40.7 | 49.6 |
| | 24 | | 73.4 | 50.3 | 61.3 |
| No Preincubation | 0 | 82 | 21.7 | | |
| | 5 | | 28.5 | 6.8 | 8.3 |
| | 10 | | 51.7 | 30.0 | 36.6 |
| | 24 | | 62.6 | 40.9 | 49.9 |

*Example IV*

The following test demonstrates the advantage of carrying out the fermentation under an atmosphere of carbon dioxide. An aqueous fermentation medium having the following composition was prepared in duplicate.

0.2 M dibasic ammonium phosphate (pH 7.6 with HCl) _____ ml__ 15.0
MnSO₄ (0.1 M) _____ ml__ 0.5
Sucrose _____ g__ 1.0
Water _____ ml__ 4.5
Carbon tetrachloride _____ ml__ 5.0
Dry baker's yeast, Type 1821 _____ g__ 1.5

The head space in one of the fermentation flasks was filled with nitrogen, the other with carbon dioxide, and both flasks were incubated at 37° C. in a water bath with shaking. Thereafter, the pH of each flask was adjusted to 7.6 with aqueous sodium hydroxide, and to each flask were added 30 ml. of aqueous 2% alpha-ketoglutaric acid solution which had likewise been adjusted to pH 7.6 with aqueous sodium hydroxide. The fermentation was then resumed under nitrogen and carbon dioxide, as before. The results at the end of ten hours were as follows:

| Atmosphere | Time, hr. | α-Keto-glutarate added, μM./ml. | L-Glutamic Acid | | |
|---|---|---|---|---|---|
| | | | Found, μM./ml. | Synthesized, μM./ml. | Conversion, percent |
| N₂ | 0 | 82 | 5.6 | | |
| | 10 | | 19.7 | 14.1 | 17.3 |
| CO₂ | 0 | 82 | 6.3 | | |
| | 10 | | 59.8 | 53.5 | 65.3 |

*Example V*

The following tests illustrate the effects of different concentrations of metallic ion enzyme activator. An aqueous fermentation medium having the following composition was prepared.

0.2 M dibasic ammonium phosphate (pH 7.6 with HCl) _____ ml__ 15.0
Sucrose _____ g__ 1.0
Water _____ ml__ 4.5
Carbon tetrachloride _____ ml__ 5.0
Dry baker's yeast, Type 1821 _____ g__ 3.0

Five portions of the medium were made up, and to the portions were added manganese ion in concentrations ranging from 0 to 0.01 molar, together with about 80 μM./ml. of alpha-ketoglutarate. The mixture was incubated in a nitrogen atmosphere on a reciprocal shaker at 37° C. for 17 hours. The results were as follows:

| Mn ion Concentration, Molar | α-Keto-glutarate added, μM./ml. | L-Glutamic Acid | |
|---|---|---|---|
| | | Synthesized, μM./ml. | Conversion, percent |
| 0 | 82 | 21.3 | 26.0 |
| 5×10⁻⁴ | 78.8 | 30.8 | 39.1 |
| 10⁻³ | 78.8 | 32.5 | 41.2 |
| 5×10⁻³ | 80.4 | 38.1 | 47.4 |
| 10⁻² | 78.8 | 26.8 | 34.0 |

*Example VI*

The following test illustrate the results of employing various alkaline materials for pH adjustment. An aqueous fermentation medium having the following composition was prepared:

0.2 M dibasic ammonium phosphate (pH 7.6 with HCl) _____ ml__ 30.0
MnSO₄ (0.003 M) _____ ml__ 0.2
Water _____ ml__ 9.8
Dry baker's yeast, Type 1821 _____ g__ 6.0
Sucrose _____ g__ 2.0
Carbon tetrachloride _____ ml__ 10.0

The medium was incubated 2 hours at 37° C., and then 60 ml. of aqueous 2% alpha-ketoglutaric acid (adjusted to pH 7.6 with a selected base) were added. The complete mixture was adjusted to pH 7.6 with the selected base and returned to the 37° C. incubator. Samples were removed for analysis at 0, 24, and 48 hours. The results were as follows:

| Neutralizing Base | Time, hr. | α-Keto-glutarate added, μM./ml. | L-Glutamic Acid | | |
|---|---|---|---|---|---|
| | | | Found, μM./ml. | Synthesized, μM./ml. | Conversion, percent |
| NH₄OH | 0 | 82 | 13.7 | | |
| | 24 | | 41.1 | 27.4 | 33.4 |
| | 48 | | 65.7 | 52.0 | 63.4 |
| NaOH | 0 | 82 | 9.5 | | |
| | 24 | | 52.1 | 42.6 | 52.0 |
| | 48 | | 68.5 | 59.0 | 72.0 |
| NaOH | 0 | 82 | 27.2 | | |
| | 24 | | 67.6 | 40.4 | 49.3 |
| | 48 | | 73.3 | 46.1 | 56.2 |
| KOH | 0 | 82 | 23.1 | | |
| | 24 | | 78.8 | 55.7 | 67.9 |
| | 48 | | 81.6 | 58.5 | 71.3 |
| Ca(OH)₂ | 0 | 56.2 | 17.67 | | |
| | 24 | | 48.80 | 31.1 | 55.4 |
| | 48 | | 40.70 | 23.0 | 40.9 |
| Ba(OH)₂ | 0 | 60.5 | 21.80 | | |
| | 24 | | 51.70 | 30.0 | 49.4 |
| | 48 | | 46.20 | 24.4 | 40.3 |

From the foregoing data it will be observed that potassium hydroxide is an especially advantageous base for use in pH adjustment.

*Example VII*

The following tests illustrate the preparation of aspartic acid according to our invention. Three portions of a fermentation medium were prepared as described in Example I, adjusted to pH 7.6 with NaOH, and pre-incubated 2 hours at 37° C. under a nitrogen atmosphere. To the respective media were then added 2% aqueous solutions of oxalacetic acid, fumaric acid, and malic acid neutralized to pH 7.6 with NaOH, and the fermentation was continued, the samples being shaken on a reciprocal shaker under nitrogen.

Analysis of samples at 0 and 24 hours showed that the aspartic acid level had doubled when oxalacetate was the substrate and had increased 10 time when either fumarate or malate was the substrate.

Having now thus fully described and illustrated the character of the instant invention, what is desired to be secured by Letters Patent is:

1. In a process for preparing an alpha-amino dicarboxylate selected from the group consisting of L-aspartate and L-glutamate by fermenting an appropriate alpha-keto dicarboxylate precursor compound with yeast, the improvement which comprises carrying out said fermentation with whole yeast cells in the presence of a lipid solvent.

2. The process of claim 1 wherein the fermentation medium, prior to the introduction of alpha-keto dicarboxylate, is subjected to a preincubation of about 1 to about 10 hours.

3. The process of claim 1 wherein said fermentation is carried out in the absence of free oxygen.

4. The process of claim 3 wherein said fermentation is carried out under an atmosphere of carbon dioxide.

5. The process of claim 1 wherein said lipid solvent is carbon tetrachloride.

6. In a process for preparing an alpha-amino dicarboxylate selected from the group consisting of L-aspartate and L-glutamate by fermenting an appropriate alpha-keto dicarboxylate precursor compound with yeast and recovering the alpha-amino dicarboxylate from the reaction mixture; the improvement which comprises carrying out said fermentation with whole yeast cells in the presence of a sufficient quantity of a lipid solvent to dissolve free lipids substantially completely from said whole yeast cells.

7. A process as in claim 6 in which the fermentation is carried out at a temperature between about 20° and about 50° C.

8. A process as in claim 6 in which the fermentation is carried out in the presence of ammonium ions, phosphate ions, and a fermentable carbohydrate.

9. A process as in claim 8 in which the fermentation is carried out in the presence of an enzyme activator capable of enhancing the activity of the yeast.

10. A process as in claim 9 in which the enzyme activator is manganous sulfate and the temperature of the fermentation is maintained between about 35° and about 40° C.

11. A process for preparing L-aspartic acid which comprises fermenting a compound selected from the group consisting of oxalacetic acid, fumaric acid, and malic acid in an aqueous fermentation medium with whole yeast cells in the presence of a lipid solvent and recovering L-aspartic acid from the fermented reaction product mixture.

12. A process for preparing L-glutamic acid which comprises fermenting alpha-ketoglutaric acid in an aqueous fermentation medium with whole yeast cells in the presence of a lipid solvent and recovering L-glutamic acid from the reaction product mixture.

13. A process for preparing L-glutamic acid which comprises fermenting alpha-ketoglutaric acid at a temperature between about 35 and about 40° C. in an aqueous fermentation medium in the presence of ammonium ions, phosphate ions, carbon tetrachloride, sucrose, and manganous sulfate, and recovering L-glutamic acid from the reaction product mixture.

14. A process for preparing an alpha-amino dicarboxylate selected from the group consisting of L-aspartate and L-glutamate which comprises preparing a fermentation medium containing ammonium ions, phosphate ions, a lipid solvent, a fermentable carbohydrate, and whole yeast cells, incubating the resulting medium for at least about 15 minutes, adding an appropriate alpha-keto dicarboxylate precursor compound to the incubated medium, again incubating the resulting medium for at least about 15 minutes, and recovering said alpha-amino dicarboxylate from the fermentation reaction product mixture.

15. A process as in claim 14 in which the fermentation medium, prior to the second incubation period, is adjusted to a pH between about 6 and about 8 by addition of potassium hydroxide.

16. A process for preparing L-glutamic acid which comprises preparing a fermentation medium containing ammonium ions, phosphate ions, a lipid solvent, a fermentable carbohydrate, and whole yeast cells, incubating the resulting medium at a temperature between about 20 and about 50° C. for a period of about 1 to about 10 hours, adding alpha-ketoglutarate thereto, adjusting the pH of the medium to between about 6 and about 8, again incubating the medium in the substantially complete absence of free oxygen at a temperature between about 20 and about 50° C. for a period of about 15 minutes to about 20 hours, and recovering L-glutamic acid from the resulting fermentation liquor.

References Cited in the file of this patent

UNITED STATES PATENTS

| 2,749,279 | Smythe et al. | June 5, 1956 |
| 2,773,001 | Smythe et al. | Dec. 4, 1956 |

OTHER REFERENCES

Chemistry and Industry, February 28, 1948, by Gale, p. 131.

Advances in Protein Chemistry, vol. VIII, 1953, pp. 291 to 298, 321 and 327 to 330.